(12) United States Patent
Newhall, Jr.

(10) Patent No.: US 6,489,955 B1
(45) Date of Patent: Dec. 3, 2002

(54) RAY INTERSECTION REDUCTION USING DIRECTIONALLY CLASSIFIED TARGET LISTS

(75) Inventor: William Parsons Newhall, Jr., Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/327,015

(22) Filed: Jun. 7, 1999

(51) Int. Cl.[7] ............................................. G06T 15/00
(52) U.S. Cl. ...................................... 345/419; 345/421
(58) Field of Search .............................. 345/419, 420, 345/441, 427, 421

(56) References Cited

U.S. PATENT DOCUMENTS

| | | |
|---|---|---|
| 4,862,392 A | 8/1989 | Steiner |
| 5,357,600 A | 10/1994 | Shirman et al. |
| 5,563,989 A | 10/1996 | Billyard |
| 5,574,835 A | 11/1996 | Duluk, Jr. et al. |
| 5,757,321 A | 5/1998 | Billyard |
| 5,777,620 A | 7/1998 | Billyard |
| 6,061,065 A * | 5/2000 | Nagasawa ................ 345/427 |

OTHER PUBLICATIONS

Foley et al., *Computer Graphics Principles and Practice: Second Edition Inc*1997.*

Zhang, Hansong and Hoff, Kenneth E. III,"Fast Backface Culling Using Normal Masks", ACM Interactive 3D Graphics Conference, 1997, pp. 103–106.

Kumar, Subodh et al, "Hierarchical Back–Face Computation", Proceedings of 7th Eurographics Workshop on Rendering, Jun. 1996, pp. 235–244,293.

Glassner, A., "Spacetime Ray Tracing for Animation", IEEE Computer Graphics & Applications, Mar. 1998,pp.60–70.

Arvo, J., Kirk, D., "Fast Ray Tracing by Ray Classification", Computer Graphics, vol. 21, No. 4, Jul. 1987,pp.55–63.

Ohta, M., Maekawa, M., "Ray Coherence Theorem and Constant Time Ray Tracing Algorithm", Computer Graphics 1987(Proc. of CG International'87)(ed. T.L.Kunni), pp.303–314.

(List continued on next page.)

*Primary Examiner*—Mark Zimmerman
*Assistant Examiner*—Lance W. Sealey
(74) *Attorney, Agent, or Firm*—Scully, Scott, Murphy & Presser

(57) ABSTRACT

A method and apparatus, in a computer graphics display system, for reducing the number of polygon intersection tests required to test a ray against a set of polygons. With this method, a multitude of polygons that represent images of object or parts of objects are identified, and these polygons are grouped into a plurality of groups on the basis of the general orientations of the polygons. Also, a ray is identified that represents a line of sight, and the general direction of the ray is compared with the general orientations of the polygons in the above-mentioned groups of polygons. On the basis of this comparison, selected groups of polygons are eliminated from further consideration. Polygons in other groups may be tested to determine if the ray intersects the polygons. The preferred embodiment of the invention described herein in detail has a number of important features. These include (1) a compressed representation of the general direction of displacement of a 3D vector called the directional classification code and a method for computing it given a vector, and (2) a conservative but efficient technique for determining whether the dot product of two vectors of equal length will result in a positive or negative value by comparing their directional classification codes using boolean logic.

28 Claims, 8 Drawing Sheets

OTHER PUBLICATIONS

Kajiya, J., "The Rendering Equation",Computer Graphics 20(4), Aug. 1986, vol. 20, No. 4, 1986,pp.143–150.

Kay, Tim et al, "Ray Tracing Complex Scenes", Computer Graphics 20(4),vol. 20,No. 4,Aug. 1986,pp.269–278.

Fujimoto, Akira et al, "Arts: Accelerated Ray Tracing System", IEEE Computer Graphics & Applications, Apr. 1986, pp. 16–26.

Glassner,A., "Space Subdivision for Fast Ray Testing",IEEE Computer Graphics & Applications,4(10),Oct. 1994, pp.15–22.

Cook, Robert L. et al, L,"Distributed Ray Tracing", Computer Graphics,vol. 18,No. 3,Jul. 1984,pp.139–145.

Whitted, T.,"An Improved Illumination Model for Shaded Display",Communications of the ACM,vol. 23, No. 6,Jun. 1980,pp.132–135, 138.

Arvo, J.,"Ray Tracing with Meta–Hierarchies", arvo@apollo.hp.com,arvo@yale.edu,pp.1–7.

* cited by examiner

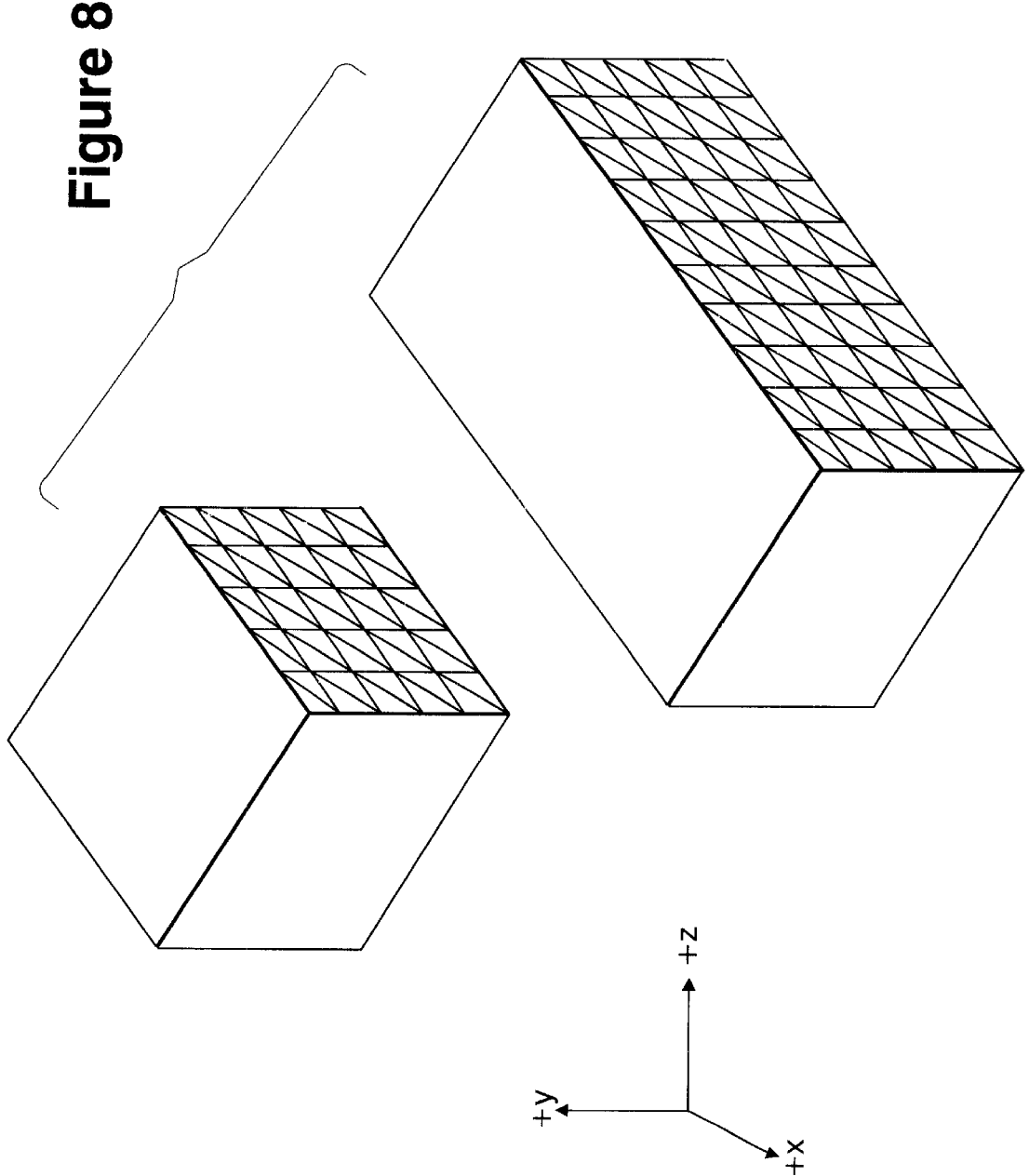

RAY INTERSECTION REDUCTION USING DIRECTIONALLY CLASSIFIED TARGET LISTS

BACKGROUND OF THE INVENTION

This invention generally relates to computer graphics display systems. More specifically, the invention relates to using ray tracing and backface culling technique to reduce the number of polygon intersection tests required to test effectively a ray against a set of polygons.

Backface Culling

Backface culling is a method of reducing the number of polygons rendered by a scan converting rendering architecture. The basic premise is simple: If we assume that the polygons we render are planar and only visible from one side, then we can easily detect when a polygon is facing away from the camera and eliminate it from consideration. The end result is that the time and computational resources which would have been wasted rendering invisible polygons can be used more efficiently on visible polygons. Since most computer graphics databases consist of polygon meshes of convex objects, approximately half of the polygons are backfacing when viewed from a single perspective. Therefore, the use of this technique effectively doubles the number of polygons processed by a scan converting rendering architecture in a given amount of time.

The traditional technique for culling backfacing polygons involves computing the normal vector of the plane in which each polygon lies and computing the dot product of this normal vector with the view vector from the camera focal point to a point on the surface of the polygon. If the sign of the dot product is positive, then the polygon is facing away from the camera (backfacing) and as such can be culled.

If the operation is performed in "camera coordinates" in which the virtual camera's center of projection is the origin of the coordinate system and the virtual camera's view direction vector is equal to the positive-Z axis of the coordinate system, then the computation of the dot product reduces to a simple sign check of the Z component of the polygon's plane normal vector. If the sign of the Z component is positive, then the polygon is backfacing and can be culled, otherwise the polygon must be drawn.

Recent articles disclose procedures that attempt to improve the efficiency of the process of backface culling in a scan converting rendering architecture. These articles include "Fast Backface Culling Using Normal Masks," Zhangh, Hansen and Hoff, ACM Interactive 3D Graphics Conference, 1997 (Zhangh, et al.), and "Hierarchical Back-Face Computation," Kumar, Subodh et al., Proceedings of 7th Eurographics Workshop on Rendering, June 1996, pp. 231–240 (Kumar, et al).

Zhang, et al. transforms unit normal vectors from 3D Cartesian coordinates (x,y,z) into polar coordinates (theta, phi) with an implied rho of 1.0. These 2D coordinates are used to generate a one-bit address within a backfacing mask—a two dimensional grid of single bit elements each of which corresponds to a solid angle on the unit sphere and represent all the unit normal vectors oriented within that solid angle. Any given unit vector can be mapped to one and only one bit in the 2D mask array. All of the normals mapped to one of the bits are said to belong to a "normal cluster" represented by that particular bit.

Each time the camera changes orientation a backfacing mask is constructed by determining for each bit in the mask whether all of the normals lying within the cluster are backfacing. This determination is performed by computing the dot products between the camera and each of the normals at the four corners of the represented solid angle. If all of the dot products are positive, then the bit is set in the backfacing mask, indicating that all normals in the cluster would be backfacing. This process is repeated for each cluster in the backfacing mask. After the backfacing mask has been generated, the polygons can be processed in turn. Each polygon's normal vector is computed from the cross product of its first and last edge vectors and is mapped to a normal cluster on the backfacing mask. If the corresponding backfacing mask bit is set, then the polygon is culled, otherwise the polygon is rendered. The mask technique described in Zhang, et al. offers a linear improvement in performance (forty to eighty percent faster) over traditional dot product evaluation, but can not achieve more than a one hundred percent increase in speed due to the fact that each polygon must be fetched and tested.

An approach advocated in Kumar, et al. groups normal vectors into a hierarchical tree of clusters based on position and orientation of polygons and their normal vectors. Each cluster divides space into three regions—the front, the back, and a mixed region—using separation planes. If the camera view point lies in the front region of a cluster, then all the polygons in the cluster are front facing. If the camera view point lies in the back region of a cluster, then all the polygons in the cluster are back facing. If the camera view point lies in the mixed region of a cluster, then sub clusters within the cluster must be evaluated because some of the polygons are front facing while others are backfacing.

This technique tests each cluster as a whole against the camera position and direction vectors without requiring that each triangle be explicitly fetched. In addition, this algorithm attempts to make use of frame-to-frame coherence. This algorithm does not eliminate one hundred percent of the backfacing polygons, but it eliminates between sixty and one hundred percent of these polygons, depending upon the polygon database.

Because the technique described in Kumar, et al. does not require each triangle to be tested, it is said to be a sublinear algorithm and as such has the potential to achieve an increase in speed of greater than one hundred percent. In practice, the algorithm achieves an increase in speed of between thirty and seventy percent when employed in a scan converting rendering architecture. This is because this algorithm significantly limits other optimizations, such as state sorting and vertex sharing, which are of critical importance to a scan converting architecture.

Ray Tracing

Ray tracing, also referred to as ray casting, is a technique employed in the field of computer graphics for determining what is visible from a vantage point along a particular line of sight. It was first reported as a technique for generating images and was first reported in "Some Techniques for Shading Machine Renderings of Solids", Appel, AFIPS 1968 Spring Joint Computer Conference, 32, 37–45 (1968) (Appel). Many improvements have been published including support for reflections and shadows, soft shadows and motion blur, and indirect illumination and caustics. These improvements are discussed in "An Improved Illumination Model for Shaded Display," Whitted, Communications of the ACM, Volume 23, Number 6, June 1980 (Whitted); "Distributed Ray Tracing," Cook, Porter and Carpenter, Computer Graphics 18(3), July 1984, pp. 137–145 (Cook et al.); and "The Rendering Equation," (Kajiya) Computer Graphics 20(4), August 1986, pp. 269 (Kajiya).

Ray tracing has also been used to compute form factors for iterative thermal transfer and radiosity computations

[Wallace89]. Ray tracing is the most sophisticated visibility technique in the field of computer graphics, but it is also the most computationally expensive.

A ray is a half line of infinite length originating at a point in space described by a position vector which travels from said point along a direction vector. Ray tracing is used in computer graphics to determine visibility by directing one or more rays from a vantage point described by the ray's position vector along a line of sight described by the ray's direction vector. To determine the location of the nearest visible surface along that line of sight requires that the ray be effectively tested for intersection against all the geometry within the virtual scene and retain the nearest intersection.

An alternative to scan conversion for rendering an image involves directing one or more eye rays through each pixel in the image from the center of projection or points on the lens of the virtual camera. After basic visibility has been determined, ray tracing can be used to compute optically correct shadows, reflections, or refraction by firing secondary rays from the visibility points along computed trajectories.

Ray tracing renderers often employ secondary rays to capture the effects of occlusion, reflection, and refraction. Because these secondary rays can originate from points other than the center of projection of the virtual camera and can travel in directions other than the line of sight of the virtual camera a ray tracer cannot use the sign bit of the Z-component to determine if a polygon is backfacing. The polygon's normal vector could be precomputed in a preprocess and the dot product between the ray direction vector and this precomputed normal vector could be computed by the ray polygon intersection function. However, this approach would only yield a modest improvement at the cost of performing unnecessary memory accesses and dot product calculations for polygons which are front facing.

What would be better, and what is specified here, is a technique for grouping polygons together which have common orientation such that a single comparison between the ray direction and a representative direction for the group of polygons could eliminate large numbers of ray polygon intersection tests instead of just one. While each polygon is only processed once by a scan converting rendering architecture for each rendered frame, a ray tracer effectively processes each polygon millions of times (once for every ray cast) for each rendered frame. As a result, the effectiveness of such a technique would significantly reduce the computation, memory access, and rendering time necessary to produce images with ray tracing.

Ray Tracing Acceleration Using Intersection Test Reduction

To render a photorealistic picture of a 3D virtual scene with ray tracing requires hundreds of millions of rays and billions of ray intersection tests—depending upon the complexity of the scene, the number of light sources, and the resolution of the rendered image. It has been an active area of research to reduce the number of ray intersection tests while ensuring that accurate visibility is maintained. It is necessary for any ray intersection reduction technique to be conservative; that is, only irrelevant intersection tests should be eliminated. The method of testing a technique against this requirement is simple: A set of rays R tested against a set of targets T should result in a set of nearest intersection values I whether or not the ray intersection reduction technique is employed.

Prior art techniques for reducing the number of ray intersection calculations can be classified in three categories: Bounding volume techniques, spatial subdivision techniques, and directional techniques. Each of these techniques attempt to reduce the amount of computation required at the inner loop of the rendering process by preprocessing the scene into some sort of data structure that can be more efficiently traversed.

Bounding Volume Techniques

Bounding volume techniques were first introduced in an article "An Improved Illumination Model for Shaded Display", Whitted, Communications of the ACM, Volume 23, Number 6, June 1980. This technique is based on the principal that if many geometric targets can be completely enclosed in a sphere in a rendering preprocess, then any rays which must be tested against the targets are first tested for intersection with the sphere. If a ray does not intersect the sphere, then it cannot intersect any of the geometric targets inside the sphere, and many ray intersection computations can be avoided. Other bounding volume techniques employ boxes, or groups of slabs or plane sets [Kay86] instead of spheres to provide a tighter fitting bounding volume. One such technique is discussed in "Ray Tracing Complex Scenes," Kay and Kajiya, Computer Graphics 20(4), August 1986, p. 269.

The efficiency of bounding volume techniques is directly related to the tightness of the bound and inversely proportional to the complexity of the ray bounding volume intersection test. Spheres and boxes allow for very fast ray intersection computation, but there are frequently encountered cases where the target they attempt to bound is not tightly bounded by the sphere or box and a large number of unnecessary ray intersection calculations result. Conversely, a customized polygon mesh can provide an extremely tight bound, but can very easily require nearly as many (or more) intersection tests than the geometry it attempts to bound. Bounding volumes are best used in concert with spatial subdivision or directional techniques.

Spatial Subdivision Techniques

Spatial Subdivision techniques were first introduced in an article "Space Subdivision for Fast Ray Tracing," Glassner, IEEE Computer Graphics and Applications, 4(10), October 1984, pp. 15–22. These techniques are significantly more efficient than bounding volume techniques but require more preprocessing work. Spatial Subdivision techniques divide space into uniform grids or octrees. For example, a procedure that uses uniforms grids is discussed in [Fujimoto85], and a procedure that uses octrees is described in the above-mentioned Glassner article. Each voxel (cell in the grid) enumerates the geometric targets which partially or completely lie within it and when the ray is tested against the octree or uniform grid only those cells which lie along the path of the ray are consulted. This aspect of these techniques significantly reduces the number of geometric targets which need to be tested against each ray.

Voxels and Octrees also provide a mechanism referred to as an early exit mechanism. The cells which lie along the path of the ray are tested starting with the cell nearest to the ray origin point and ending with the cell which is farthest along the ray's path. With this mechanism, if the ray intersects a geometric target within a cell, then the search may be halted after the remaining targets within the cell have been tested. The additional cells along the path of the ray are irrelevant because they lie beyond an intersection which is closer to the ray origin and as such any geometry within them would be occluded by that intersection. Another spatial subdivision techniques is described in [Kaplan85]. In this technique, Binary Separation Planes are used to subdivide space to reduce the number of target candidates.

Spatial subdivision techniques have matured and evolved into a number of different forms: Octrees, uniform grids, and BSP trees. They are simple to construct and traverse and offer an efficient early exit mechanism.

Directional Techniques

Directional techniques were first introduced in [Haines86]. These procedures attempt to use directional coherence to eliminate geometric targets from consideration in a manner similar to the manner that spatial subdivision techniques make use of spatial coherence to eliminate geometric targets. Where spatial techniques use a 3D grid in space directional techniques make use of a 2D grid of elements subtending finite solid angles mapped onto 2D surfaces. Examples of directional techniques are discussed in [Haines86], "Ray Coherence Theorum and Constant Time Ray Tracing Algorithm." Ohta, et al., Computer Graphics 1987 (Proc. of CG International '87) (ed. T. L. Kunmi, pp. 303–314); and [Arvo87].

The technique described in [Haines86] uses a light buffer to reduce the number of objects tested for shadow ray intersection computation. The light buffer is a 2D grid mapped onto the surface of a direction cube surrounding a point light source. Each cell of the direction cube contains a near-to-far ordered list of the geometric targets visible within the solid angle subtended by the cell. To determine if a point is illuminated by the light or is occluded by another object, the shadow ray (originating at the point and directed at the light) is intersected with the surface of the direction cube and mapped into the 2D grid. The list of targets enumerated in the appropriate cell is then tested against the ray. If the ray intersects any target between the point and the light, then the search ends and the point is in shadow, otherwise the point is illuminated by the light. A similar approach known as First Hit Acceleration makes use of depth buffering scan conversion hardware to render from the camera's point of view, but instead of storing colors in the frame buffer, the first hit acceleration approach stores a pointer or reference to the nearest target along the trajectory of the ray passing through each pixel.

The procedure, referred to as 5D Ray Classification, described in the above-identified Arvo article transforms each ray into a 5D point (x,y,z,u,v), where (x,y,z) are the ray's origin and (u,v) are 2D coordinates mapped onto the surface of a direction cube derived from the ray's direction vector. The scene database is duplicated and sorted into six lists—one for each of the six dominant axes (+X, −X, +Y, −Y, +Z, −Z). During the rendering process the scene database is dynamically partitioned into parallelepiped subsets of 5D space (corresponding to beams in 3D space). When a ray is tested against the scene, it is "classified" (converted into a 5D point) and its dominant direction axis is computed from the sign and axis of the largest absolute valued component in the ray direction vector. A candidate list is selected which corresponds to the primary axis of the ray direction vector, and those targets within the candidate list which lie inside the parallelepiped are tested against the ray in approximately the same order that they would be encountered along the ray's trajectory. For this reason, Ray Classification supports an early exit so not all the targets need be tested when an intersection occurs near the ray origin.

Because directional techniques require multiple lists of target geometry they consume a large amount of space and are not particularly efficient with memory caching schemes.

SUMMARY OF THE INVENTION

An object of this invention is to provide an improved technique, for use in a computer graphics image generation system, to reduce the number of polygon intersection tests needed to test a ray against a set of polygons.

Another object of the present invention is to arrange a set of polygons, and to provide a simple procedure to arrange these polygons, in different groups according to the general orientations of the polygons.

A further object of this invention is to provide a compressed representation, and a procedure for computing this compressed representation, of the general direction of a ray or similarly oriented group of rays and the general direction of a polygon normal or a group of polygons with similarly oriented normals.

These and other objects are attained with a method and apparatus, in a computer graphics image generation system, for reducing the number of polygon intersection tests required to test a ray against a set of polygons. With this method, a multitude of polygons that represent images of object or parts of objects are identified, and these polygons are grouped into a plurality of groups on the basis of the general orientations of the polygons. Also, a ray is identified that represents a line of sight, and the general direction of the ray is compared with the general orientations of the polygons in the above-mentioned groups of polygons. On the basis of this comparison, selected groups of polygons are eliminated from further consideration. Polygons in other groups may be tested to determine if the ray intersects the polygons.

The preferred embodiment of the invention described herein in detail has a number of important features. These include:

(1) A compressed representation of the general direction of displacement of a 3D vector called the directional classification code and a method for computing it given a vector.

(2) A conservative but efficient technique for determining whether the dot product of two vectors of equal length will result in a positive or negative value by comparing their directional classification codes using boolean logic.

(3) A rendering preprocess in which a set of polygons in a common coordinate system are arranged into directionally classified polygon groups according to their directional classification codes.

(4) A method of sorting the polygons within a directionally classified polygon group in front to back order along a group unit normal vector.

(5) A method of reducing the number of ray-polygon intersection calculations performed by a ray tracer which uses the directional classification code, the group unit normal vector and directionally classified polygon groups.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 8 shows a set of triangles with a similar orientation that have been placed in a target group.

DETAILED DESCRIPTION OF THE PREFERRED EMBODIMENTS

Figure 1:
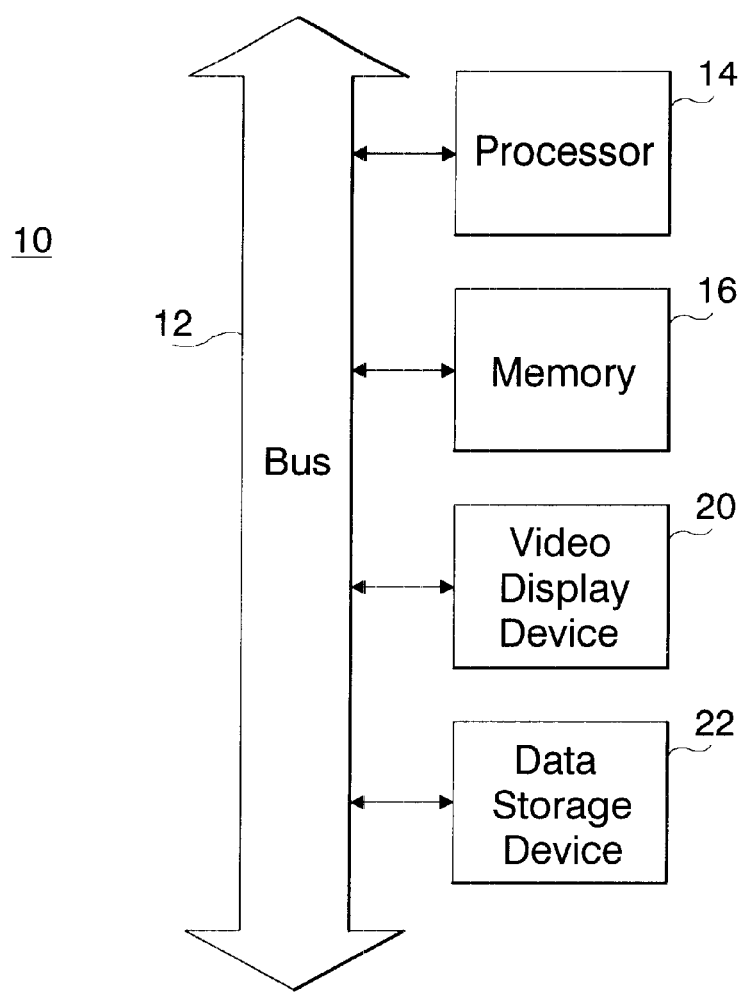
FIG. 1 schematically illustrates a computer graphics system that may be used to embody the present invention.

Computer system 10 illustrated in FIG. 1 includes a bus 12 for communicating information, a processor 14 coupled with the bus for processing information, and a memory 16 such as a RAM that is coupled with the bus for storing information and instructions for the processor. System 10 further includes video display device 20, such as a CRT raster scan device and a data storage device 22, such as a magnetic disc, coupled with the bus 12 that is also used to store information and instructions.

Alternative computer systems having specifically designed graphics engines are well known in the art. Commonly, these alternative computer systems modify the system of FIG. 1 by incorporating a specialized graphics subsystem that includes a graphics processor, a dedicated frame buffer, often in the form of video DRAM, and a video display.

Figure 2:
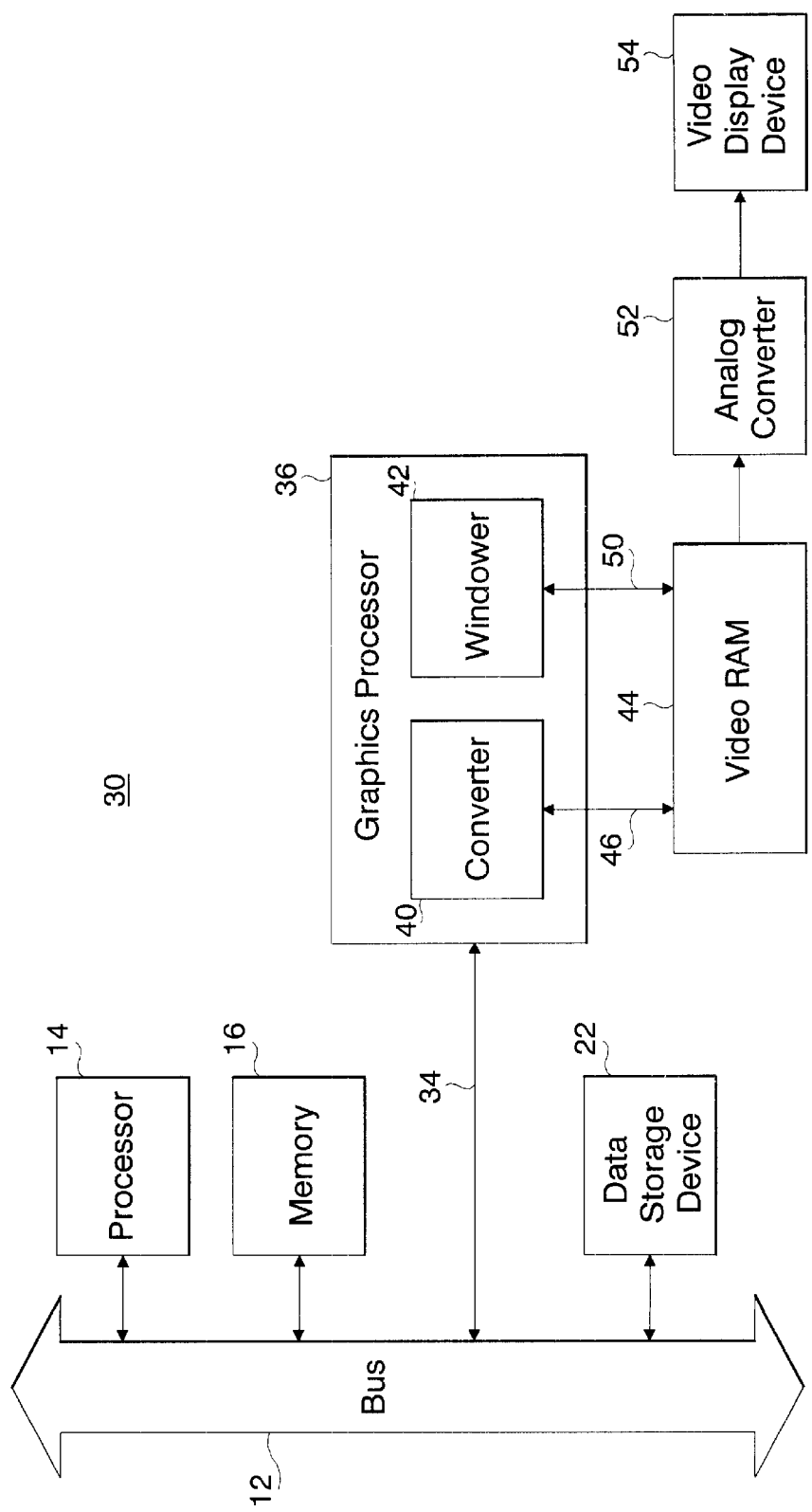
FIG. 2 shows another computer graphics system that may also be used to embody this invention.

FIG. 2 shows an example of a computer system 30 having a graphics subsystem 32. In this system 30, input image data from the main processor 14 are communicated over bus 12 and bus 34 to the graphics processor 36. This image data are typically in the form of graphics primitives such as lines, points, polygons or character strings. The graphics processor 36 receives that input image data from the main processor 14 and uses that data to create a complete image data set utilizing well known graphics techniques such as scan conversion, clipping, Gouraud shading and hidden surface algorithms.

The image data developed by the graphics processor 36 is stored in high performance memory 44, which typically includes the frame buffer. Graphics processor 36 addresses the video ram 40 over the address bus 46 while supplying the video information over bus 50. After an image has been generated, the contents frame buffer image data is read out to a digital to analog converter or transferred to another computer over a network or stored on hard disc. This image data may then be transmitted to a video display device 54 or to other raster scan display devices.

In the operation of system 30, clipped polygon information, in the form of parameter values for each vertex of a polygon is typically received by the graphics processor 36. Alternatively, that information could be calculated by the graphics processor. In either case, coordinate values for these polygon vertices are then converted by processor 36, using well known transformation techniques, to the output device coordinate space at subpixel resolution. Then, the scan conversion and filling of the polygons occurs.

Many of these polygons do not actually appear in the video image because they are on the back sides of objects in that image. For instance, when the front side of a house is shown in the video image, the polygons used to construct the image of the back side of the house are not shown in the image on the display device 54. In order to increase the rate at which the computer grapics system processes the relevent polygons, it is preferred to eliminate, or to cull, these backfacing polygons from the video processing procedure.

Figure 3:
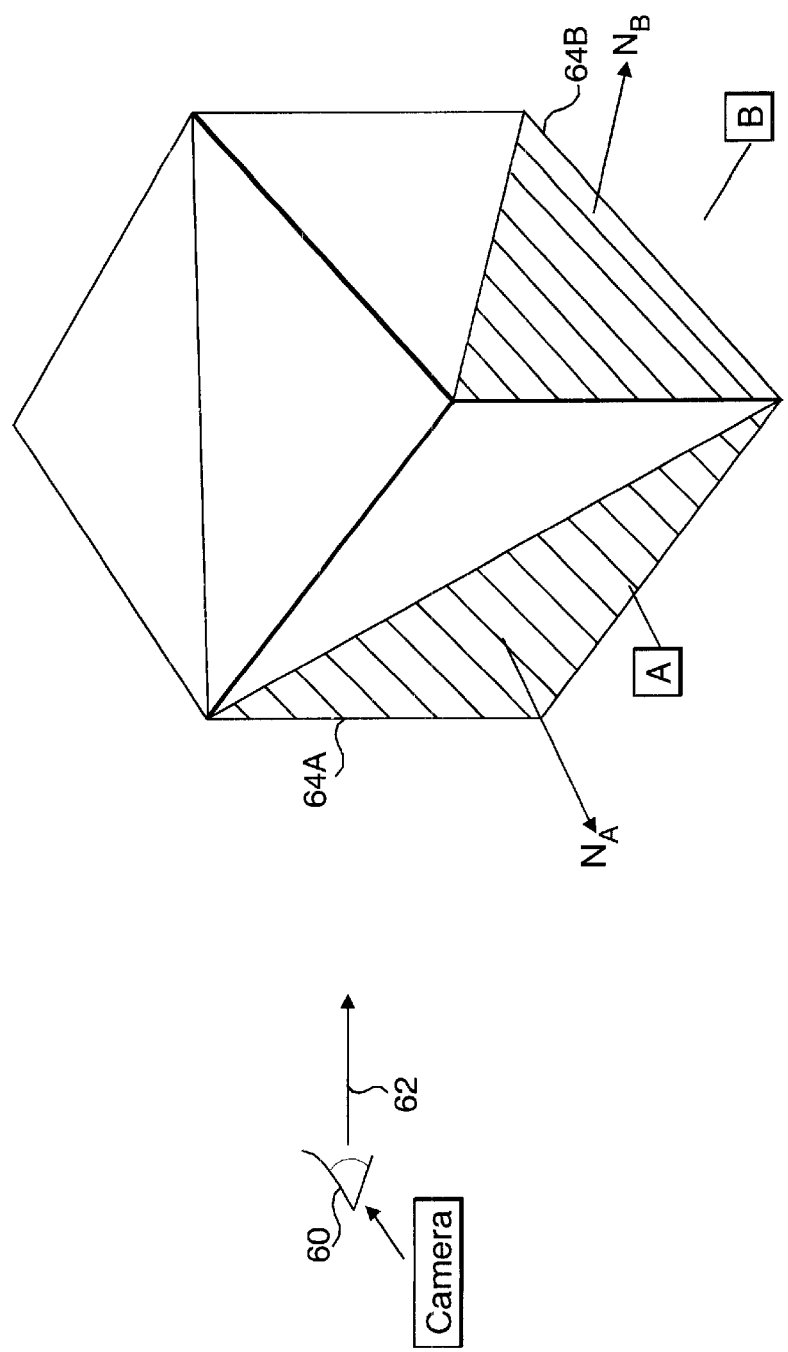
FIG. 3 illustrates the concept of backface culling in a computer graphics system.

FIG. 3 depicts the fundamental concept of backface culling. An eye 60 is located at a point in space and is looking along a view vector indicated by the arrow 62 whose base is located at the pupil of the eye. The eye is looking at a cube 64 constructed out of a set of triangles. Two triangles have been highlighted and labeled 64A and 64B. A surface normal has been drawn for each of these triangles and has been labeled $N_a$ for the surface normal vector of triangle 64A and $N_b$ for the surface normal vector of triangle 64B. Triangle 64A faces the camera and as such has the potential to be visible. Because triangle 64B faces away from the camera, it cannot be seen and can be safely culled from further rendering processing.

Figure 4:
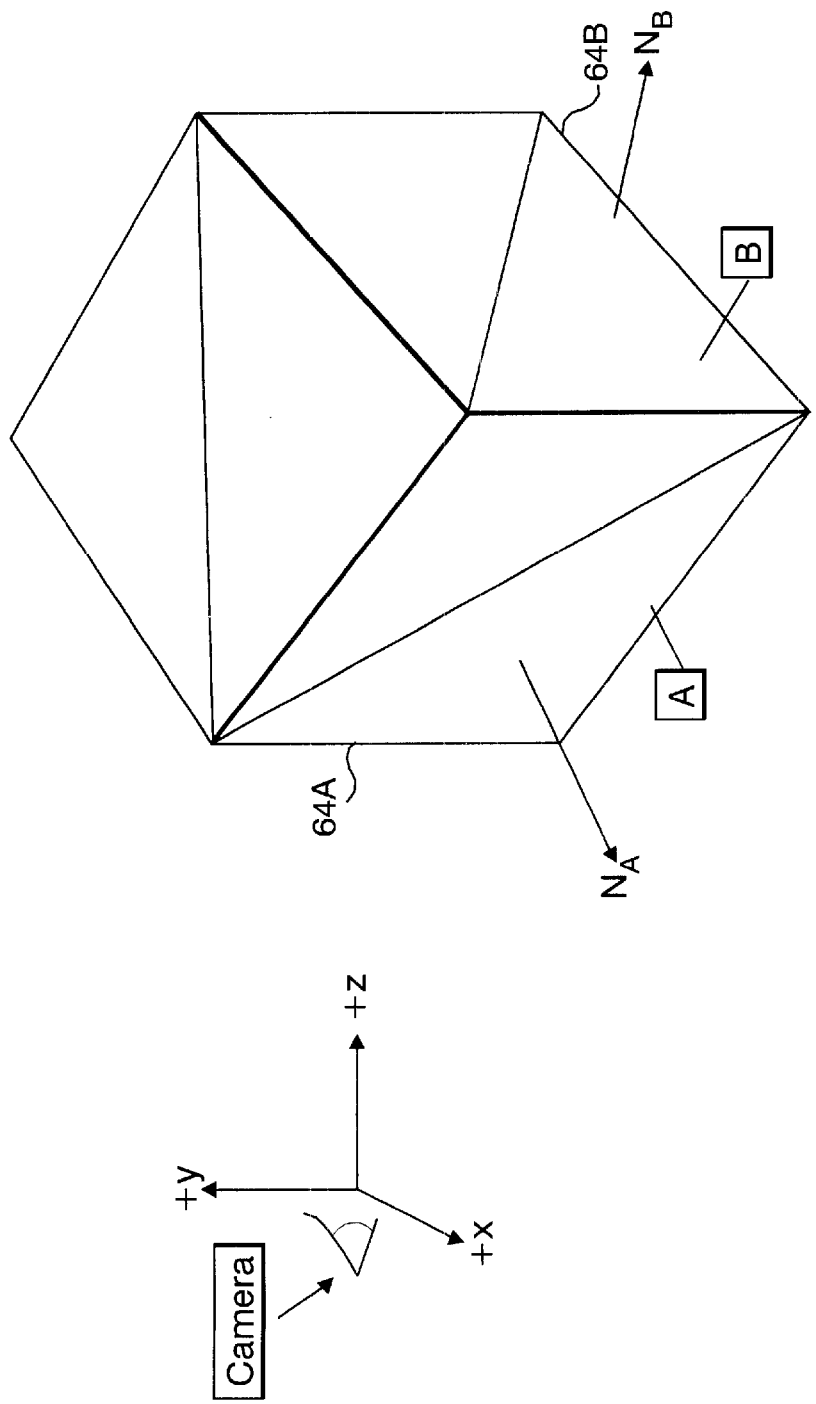
FIG. 4 depicts the concept of camera coordinate backface culling employed in scan conversion rendering architectures.

FIG. 4 illustrates the concept of camera coordinate backface culling employed in scan conversion rendering architectures. All vertices and normal vectors are in a common coordinate system where the eye is at the origin of the coordinate system and the view vector is equal to the positive Z axis. In this approach, the process of determining back facing polygons consists of checking the sign of the Z component of each polygon's surface normal vector. If the surface normal vector's Z component is positive, then the polygon can be assumed to be backfacing. In this example, the Z component of vector $N_a$ is negative so triangle 64A has the potential to be visible, but the Z component of vector $N_b$ is positive indicating that triangle 64B is backfacing.

Figure 5:
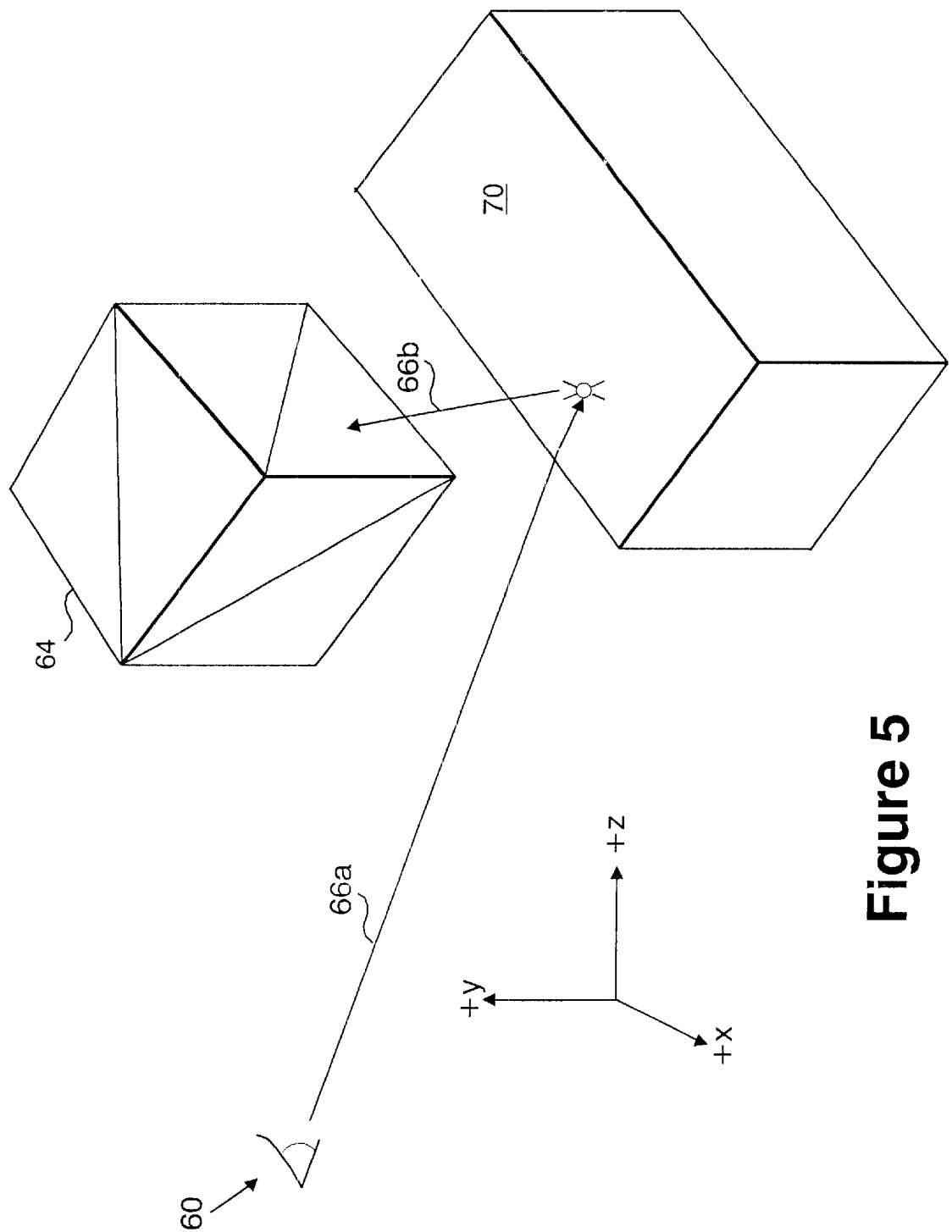
FIG. 5 pictorially illustrates the problems ray tracing poses to the traditional backface culling problem.

FIG. 5 depicts the problems ray tracing poses to the traditional backface culling problem. Note that in ray tracing, the origin of the coordinate system is no longer the camera position and that the positive Z axis is no longer the camera's line of sight. This drawing depicts the flight of two rays. The first 66a is referred to as an eye ray for it originates at the center of projection of the camera (the eye) and travels through a pixel of the image plane. This first ray strikes the surface of a long rectangular box 70 behind cube 64. The second ray 66b is referred to as a reflection ray and is directed from the surface of the long rectangular box along an angle of reflection. Because reflection rays originate in places other than the camera and travel in directions other than the camera's line of sight, the previous generalizations of backface culling employed in scan converting rendering architectures do not apply in ray tracing rendering architectures.

The culling algorithm of this invention is based on the fundamental assertion that a single sided polygon facing east cannot be hit by a ray which is traveling east, regardless of the location of the polygon or the origin of the ray. Mathematically this can be expressed:

if N<dot product>D>0, then the ray cannot hit the polygon

Where:
  N is the polygon geometric unit normal vector, and
  D is the ray unit direction vector.

To compute the unit normal vector of a polygon and the dot product with the ray direction vector at the inner loop of a ray tracer, is computationally too expensive to provide a significant increase in performance. This cost can be reduced by computing the polygon normal as a preprocess and storing that normal with the polygon vertices. However, this requires considerably more storage and transfer bandwidth, plus the extra dot product is required at the inner loop of the ray tracer.

If the method described in Zhangh, et al., is employed then the costly process of computing the backfacing mask has to occur once for each ray. At best, either of those approaches only yields a linear increase in performance because each polygon must be explicitly fetched and tested, and it is more than likely that both approaches would actually slow down the renderer in a majority of the cases.

Instead, in the present invention polygons are grouped together based upon a directional classification code into directionally classified target groups, and then a directional classification code of the ray direction vector is tested against a directional classification code of a group header. If the test between the codes fails, then none of the triangles in the group needs to be fetched or tested. This procedure can eliminate thousands of polygons without explicitly fetching those polygons. Because of this, the procedure attains the sublinearity described in the Kumar article without requiring the exhaustive hierarchical search or spatial partitioning. Note that even more performance can be gained by buffering up and sorting rays into bundles (where each bundle contains hundreds or thousands of rays sharing the same directional classification code). In such a scenario, we can test the directional classification code of each bundle against the directional classification code of each directionally classified polygon group instead of testing each ray's directional classification code. In addition, this grouping can coexist within spatial subdivision cells or bounding volumes so it can work in concert with other acceleration methods.

Directional Classification Code

The approach of this invention is to compute the polygon normal as a preprocess, but instead of storing this polygon normal, the procedure of this invention stores a directional classification code which is a compressed representation of the orientation of the polygon's normal vector. The directional classification code retains enough information about the polygon orientation to categorically eliminate large numbers of potential ray intersection tests which have no chance of hitting the polygon. If every polygon and every ray have directional classification codes, then large numbers of ray intersection tests can be eliminated without requiring any floating-point computation in the inner loop of the renderer.

The first three bits of the directional classification code are the sign bits of the normal vector. The next six bits of this code are the relative magnitude bits for the X, Y, and Z axes. These bits indicate (for each axis) whether the axis in question is greater or lesser in absolute value than the other two axes. These bits are useful in identifying the major (largest) and minor(smallest) axes of a given vector. The major axis will have two of its relative magnitude bits set. A minor axis will have none of its relative magnitude bits set.

In certain circumstances, it may be necessary to handle polygons or rays which have not been directionally classified. In the preferred embodiment, such polygons are given a directional classification code of zero. The directional classification code of zero and any other directional classification code returns true. Any ray with a directional classification code of zero needs to be tested against any target regardless of its directional classification code. Any target with a directional classification code of zero needs to be tested against any ray regardless of its directional classification code.

Divining the Sign of the Dot Product

FIG. 3 demonstrates that the sign of the dot product between the view vector 62 and the triangle normal, either $N_A$ or $N_B$, determines whether the triangle, either 64A or 64B, is facing away from the view vector. Generally, the dot product between a three dimensional polygon normal vector N and a three dimensional camera view vector V can be expressed mathematically:

$$N{<}dot\ product{>}V=(N.X * V.X)+(N.Y * V.Y)+(N.Z * V.Z)$$

Where:

N is the polygon normal vector, and

V is the camera view vector.

If the sign bits of the (X,Y,Z) components of vector N are the same as the sign bits of the (X,Y,Z) components of vector D, then the dot product will be positive, and the intersection test need not be performed. Henceforth, a reference to a "sign match" between two unit vectors expresses the fact that the X, Y, or Z component of the first vector has the same sign as the same component in the second vector.

The optimization in the previous paragraph (three sign bit matches) works well, but may cast too narrow a net to be highly effective alone. Using the relative magnitude bits, it is possible to eliminate more polygons using simple Boolean logic and the directional classification codes when less than three sign bit matches occur:

1. A positive dot product always results from two unit vectors sharing only two sign matches when the major axis of the first vector is matched in sign and axis to the major axis of the second vector.
2. A positive dot product always results from two unit vectors sharing only two sign matches when (i) the major axis of the first vector is matched in sign to a non-minor component of the second vector and (ii) the major axis of the second vector is matched in sign to a non-minor component of the first vector.

Directionally Classified Polygon Groups

Figure 6:
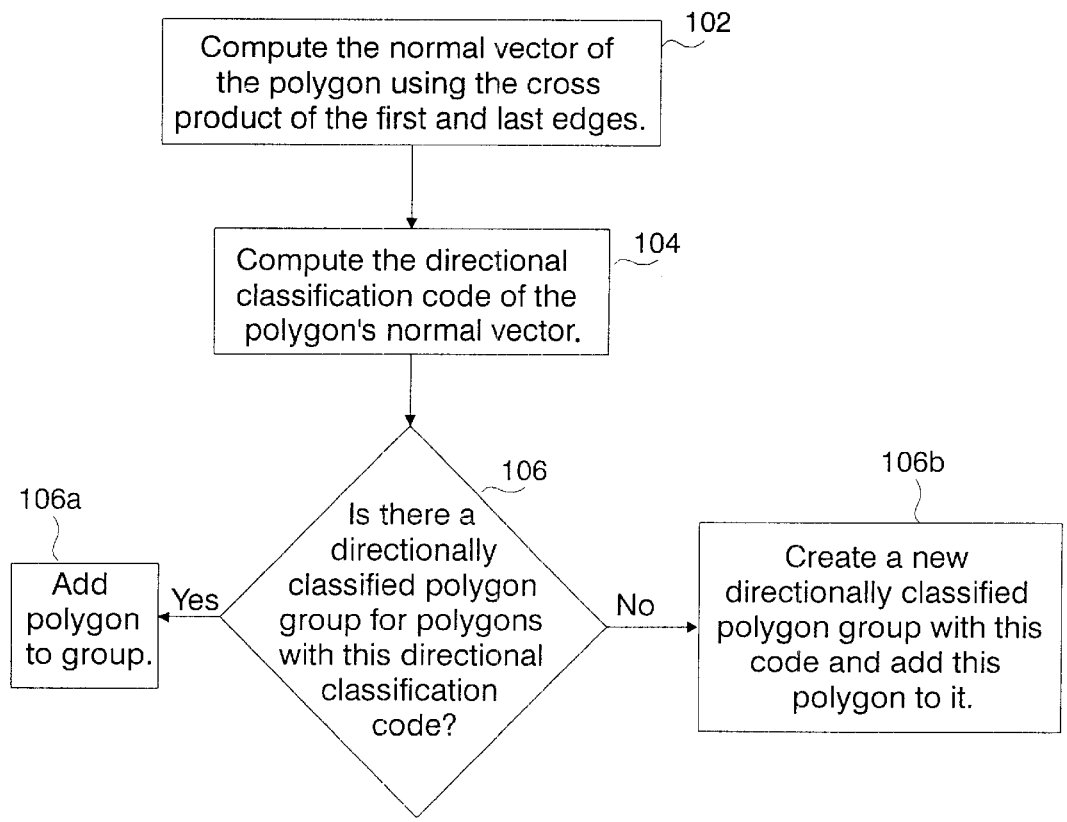
FIG. 6 is a flow diagram showing steps used to classify various polygons into groups.

With reference to FIG. 6, a set of polygons within a scene, bounding box, voxel grid, or BSP half-space can be organized into directionally classified polygon groups by computing the normal vector, as represented by step 102 and a corresponding directional classification code for each polygon, as represented by step 104. A directionally classified target list is constructed where each node in the list includes a field for a directional classification code, a 3D vector, and a pointer to a linked list of triangles. Initially the list is a null list. As each polygon's directional classification code is computed, the directionally classified target list is searched, as represented by step 106, to find a node with a matching directional classification code. If a corresponding node is found, then as represented by step 106a, a new target list element is created and added to the node's target list and the polygon normal vector is added to the group normal vector in the node. If no such node is found, then, as represented by step 106b, a new node is created and added to the directionally classified target list with said directional classification code, normal vector, and a pointer to a new target list element whose pointer references said triangle.

Front to Back Ordering

When all the polygons in the set have been classified and processed, each node in the directionally classified target list counts the number of polygons in its target list and divides its group normal vector by that number. This vector is then divided by its length to obtain a value referred to as the group unit normal vector. The node then computes and stores the minimum and maximum extent along the group unit normal vector of each triangle in its target list. To compute the extent of a vertex against a group unit normal vector, the procedure computes the dot product of the vertex position vector and the group unit normal vector The minimum and maximum extents of a triangle are calculated by computing the extent of each vertex of the triangle and evaluating the minimum and maximum extent values. The target list nodes can then be sorted according to their maximum extents in positive to negative order, which are stored as fields within the target list node. This has the effect of sorting the triangles in front to back order for a majority of the viewpoints from which the triangles are visible.

Accelerated Ray Tracing

Figure 7:
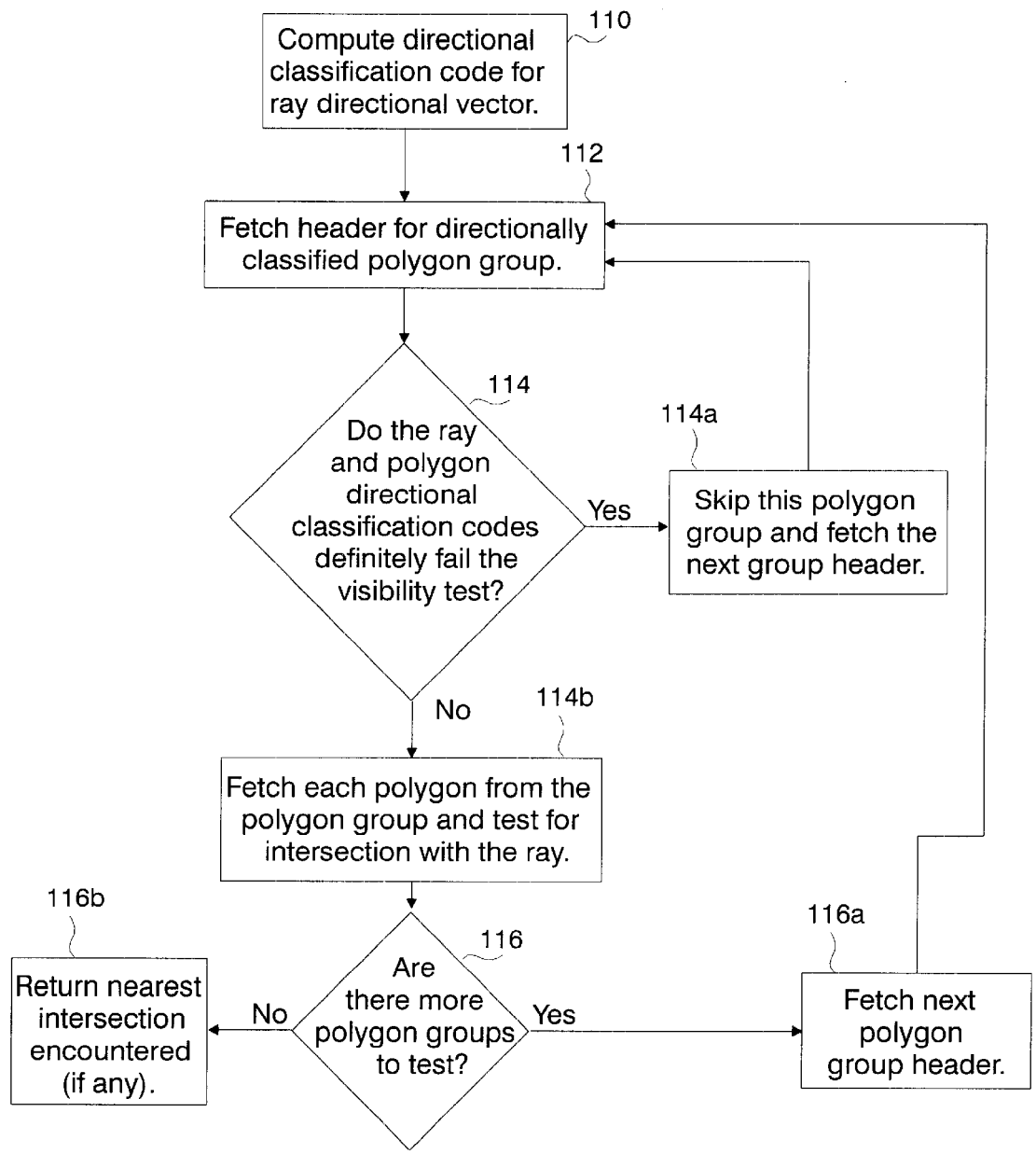
FIG. 7 is a flow diagram that outlines a procedure for determining which polygon groups need to be tested for ray intersection.

With reference to FIG. 7, when a ray is to be tested against a directionally classified target list, a directional classification code is computed from the ray's direction vector, as represented by step 110. Each node in the directionally classified target list contains a set of targets oriented in a common direction represented by the node's directional classification code. As represented by step 112 and 114, the ray's directional classification code is tested against the directional classification codes of the nodes in the directionally classified target list using the criteria described above.

If the resulting comparison predicts a positive dot product, then all of the targets in the node's target list need not be fetched or tested against the ray because they are definitely backfacing, as represented by step 114a. Otherwise, as represented by step 114b, the targets in the list need to be tested against the ray.

This process continues, as represented by steps 116, 116a and 116b of FIG. 7, until all the polygon groups have been tested. When this is done, the nearest encountered intersection is returned.

If a result of a directional classification test between a ray and a directionally classified triangle list is true, it means that it is possible for the ray to hit one or more of the polygons in the directionally classified triangle list. In most ray tracing applications, a given ray needs only to be tested against enough targets to establish the nearest visible target. Because directional classification codes guarantee certain properties among the polygons and rays which are tested against them, it is possible to sort the polygons of a directionally classified target group before rendering so they are tested in front to back order (most positive extent first, most negative extent last) and only test each ray against a fraction of the polygons in the directionally classified target list.

If the rays which are to be tested against the polygons in the directionally classified target list are sorted (most positive extent first, most negative extent last), then only the fraction of rays in the list which are in front of the polygon and have hit no other targets in front of the polygon actually get tested against the polygon. When the minimum extent of a ray is greater than (less negative than) the maximum extent of the polygon being tested, it can be swapped out of the list of rays being tested against that directional classification list and can be replaced by a ray whose minimum extent is less than (more negative than) the minimum extent of the polygon being tested. This ensures that the replacement ray could not have previously hit any of the polygons which had already been tested against the rays in the list.

With the preferred embodiment of the invention described herein in detail, before testing the ray against the contents of the node's target list, it is necessary to compute the extent of the ray's position vector along the group unit normal vector. This is computed as the dot product of the ray position vector and the group unit normal vector. This value will be stored with the ray as the ray's maximum extent along the group unit normal vector. If the ray has already intersected another target then the extent of the intersection point along the group unit normal vector needs to be computed and stored as the ray's minimum extent along the group unit normal vector. If a ray has not yet hit a target, then the minimum extent is assigned the value of negative infinity by default. When the minimum and maximum extents have been computed, the target list can be traversed.

The ray need not be tested against polygons whose minimum extent along the group unit normal vector is greater than the ray's maximum extent along the group unit normal vector because the ray originates behind the triangle and faces away from it. The ray need not be tested against polygons whose maximum extent along the group unit normal is less than the ray's minimum extent because the polygon lies beyond the polygon already intersected by the ray. Only targets whose minimum extent is less than the ray's maximum extent and whose maximum extent is greater then the ray's minimum extent need to be tested against the ray. If the ray intersects a target, then the intersection is retained and its extent along the group unit normal vector is computed. Subsequent targets are tested against the ray, replacing the intersection test with (and computing the extent of) any intersection which is closer to the ray's position vector. Intersection testing ceases when a prospective target has a maximum extent which is smaller than the extent of the nearest ray intersection. When testing the ray against multiple directionally classified target lists, it is important to retain the nearest intersection and recompute extent of the ray along each group unit normal vector. By skipping over triangles which lie behind the ray origin and providing an early exit for occluding intersection, the procedure further reduce the number of ray triangle intersections in dense triangle meshes.

FIG. 8 shows a set of triangles with similar orientation from two separate objects which have been placed in a directionally classified target group. Because these triangles have similar orientations, it is possible to test the group as a whole for backface culling instead of testing each individual triangle.

The method of this invention has been reduced to practice in Photon ray tracing workbench software in about one hundred lines of C++ code. In particular, a method has been added to a vector class called classify which returns an integer directional classification code. A new member has been added to the ray class which is called dccode which contains the directional classification code of the ray direction vector. This value is computed when the ray is created with the ray class constructor function.

Code has been added to a method function called TriangulateClippedPolygon, in a SEADS voxel class which computes each triangle's geometric normal vector and groups triangles together which have a common directional classification code. This function is called once during the scene assembly rendering preprocess.

A new target subclass, dctargetlist, has been added which has an integer member called dccode which represents a common classification code for all of the targets in the link list referenced by the targs member of the dctargetlist. A member function called intersectray checks the ray's dccode against the dctargetlist's dccode for the properties listed above; and depending upon the results of the test, this function either tests the ray against the list of targets or refers the ray to the next dctargetlist and returns it's results. This function is called during the inner loop of the renderer.

This algorithm has been further extended to reduce the number of intersection tests performed by the intersectray function. After the triangles are sorted into directionally classified groups, the process computes the average normal vector of all the triangles in each group (the group unit normal vector), stores this computed vector in the dctargetlist header, and computes and stores the minimum and maximum extent of each triangle along its group unit normal vector. The triangles can then be sorted according to their maximum extents in positive to negative order. This has the effect of sorting the triangles in front to back order for most vantage points from which they can be seen.

To compute the extent of a vector against a group unit normal vector, the process computes the dot product of the two vectors. The minimum and maximum extents of a triangle are calculated by computing the extent of each vertex of the triangle and evaluating the minimum and maximum extent values.

If a ray's directional classification code has satisfied the criteria described above and the ray is to be tested against the members of a directionally classified triangle list, then more efficiency can be gained by computing the extent of the ray origin vector along the group unit normal vector. The ray can skip over those triangles in the list whose minimum extent is larger than the ray's extent. Those triangles do not need to be fetched or tested against the ray because the ray originates behind them and is traveling away from them. The ray need not be tested against polygons whose maximum extent is smaller than the minimum extent if the ray because they lie beyond the nearest intersection already found by the ray. Only triangles whose minimum extent is less than the ray's maximum extent and whose maximum extent is less than the ray's minimum extent need to be tested against the ray.

If the ray intersects a triangle, then the intersection is retained and the extent of the intersection along the group unit normal vector is computed. Subsequent triangles are tested against the ray, replacing the intersection value with (and computing the extent of) any intersection which has a smaller parametric length along the ray. Intersection testing ceases between a ray and a directionally classified triangle list when a prospective triangle has a maximum extent which is smaller than the extent of the nearest ray intersection. When testing the ray against multiple directionally classified triangle lists, it is helpful to retain the nearest intersection and recompute its extent along each group unit normal vector. By skipping over triangles which lie behind the ray origin and providing an early exit for occluding intersection, the number of ray triangle intersections in dense triangle meshes can be further reduced.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of reducing polygonal candidates for intersection testing in a ray tracer comprising the steps of:
   computing a directional classfication code of a ray, and eliminating directionally classified polygon lists, each of the lists comprising a plurality of polygons represented by a directional classification code, whose directional classification code when compared with a directional classification code of the ray's directional vector using pre-established criteria would result in a positive dot product;
   if the results of the comparison show that a negative dot product would result or that the result is not certain for all vectors of the polygons represented by the directional classification code of each of the lists, then the polygons in each of the directionally classified polygon lists will be tested against the ray; and
   rendering polygons in the non-eliminated directionally classified polygon lists that intersect the ray.

2. A method in a computer graphics display system for reducing a number of polygon intersection tests required to test a ray against a set of polygons, the method comprising:
   identifying a plurality of polygons representing images of objects or parts of objects;
   grouping the polygons together into a plurality of groups on the basis of general orientations of the polygons;
   determining a group orientation value representing the general orientations of the polygons in each group;
   identifying a ray representing a line of sight;
   determining a ray direction value representing the general direction of the ray;
   comparing the direction value of the ray with the group orientation values of said groups of polygons;
   eliminating selected groups of polygons from further consideration on the basis of said comparison;
   testing polygons in remaining groups to determine if the ray intersects the polygons; and
   rendering polygons of the non-eliminated groups that are intersected by the ray, thereby resulting in a more efficient computer graphics display system.

3. A method according to claim 2, wherein the grouping step includes the steps of:
   for each of the polygons, determining a polygon orientation value representing the general orientation of the polygon; and
   grouping the polygons together into the plurality of groups on the basis of the determined polygon orientation values.

4. A method according to claim 3, wherein:
   the step of determining the polygon orientation values includes the steps of, for each of the polygons,
   i) determining a polygon normal vector, and
   ii) determining and storing a compressed representation of the polygon vector; and
   the step of grouping the polygons together on the basis of the polygon orientation values includes the step of grouping the polygons together on the basis of the compressed representations of the polygon vectors.

5. A method according to claim 4, wherein the comparing step includes the steps of:
   for each of the group of polygons, determining a group orientation value from the compressed representation of the polygon vectors of the polygons in the group;
   determining a ray direction value representing the general direction of the ray; and
   comparing the ray direction value against the group orientation values of the groups of polygons.

6. A method according to claim 2, further comprising the steps of:
   for each of the polygons, determining a polygon normal vector for the polygon; and
   for each of the groups of polygons,
   i) determining a group normal vector from the polygon normal vectors for the polygons in the group, and
   ii) using the group normal vector to sort the polygons in the group into an order.

7. A method according to claim 6, wherein the step of determining the group normal vector includes the step of adding together the polygon normal vectors for the polygons in the group to obtain the group normal vector.

8. A method according to claim 7, wherein the step of using the group normal vector to sort the polygons in the group includes the steps of:

determining a length of the group normal vector;

dividing the group normal vector by its length to determine a group unit normal vector; and for each polygon in the group, determining the extent of the polygon along the group normal vector.

9. The method according to claim 2, further comprising:

computing a directional classification code of the ray, and eliminating directionally classified polygon groups from further consideration, each of the groups comprising a plurality of polygons represented by a directional classification code, whose directional classification code when compared with the directional classification code of the ray's directional vector using pre-established criteria would result in a positive dot product; and testing the polygons in each of the directionally classified polygon groups against the ray if the results of the comparison show that a negative dot product would result or that the result is not certain for all vectors of the polygons represented by the directional classification code of each of the groups.

10. Apparatus in a computer graphics display system for reducing the number of polygons intersection tests required to test a ray against a set of polygons, the method using:

means for identifying a multitude of polygons representing images of objects or parts of objects;

means for grouping the polygons together into a plurality of groups on the basis of the general orientations of the polygons;

means for determining a group orientation value representing the general orientations of the polygons in each group;

means for identifying a ray representing a line of sight;

determining a ray direction value representing the general direction of the ray;

means for comparing the direction on value of the ray with the group orientation values of said groups of polygons;

means for eliminating selected groups of polygons from further consideration on the basis of said comparison;

means for testing polygons in remaining groups to determine if the ray intersects the polygons; and means for rendering polygons of the non-eliminated groups that are intersected by the ray, thereby resulting in a more efficient computer graphics display system.

11. Apparatus according to claim 10, wherein, the means for grouping the polygons together includes:

means for determining, for each of the polygons, a polygon orientation value representing the general orientation of the polygon; and means for grouping the polygons together into the plurality of groups on the basis of the determined polygon orientation values.

12. Apparatus according to claim 11, wherein:

the means for determining the polygon orientation values includes i) means for determining, for each of the polygons, a polygon normal vector, and ii) means for determining and storing a compressed representation of the polygon normal vectors; and the means for grouping the polygons together on the basis of the polygon orientation values includes means for grouping the polygons together on the basis of the compressed representations of the polygon vectors.

13. Apparatus according to claim 12, wherein the means for comparing includes:

means for determining, for each of the group of polygons, a group orientation value from the compressed representations of the polygon vectors in the group;

means for determining a ray direction value representing the general direction of the ray; and means for comprising the ray direction value against the group orientation values of the groups of polygons.

14. The apparatus according to claim 10, further comprising a means for computing a directional classification code of the ray, wherein the means for eliminating further comprises eliminating directionally classified polygon groups from further consideration, each of the groups comprising a plurality of polygons represented by a directional classification code, whose directional classification code when compared with the directional classification code of the ray's directional vector using pre-established criteria would result in a positive dot product; and the means for testing further comprising testing the polygons in each of the directionally classified polygon groups against the ray if the results of the comparison show that a negative dot product would result or that the result is not certain for all vectors of the polygons represented by the directional classification code of each of the groups.

15. A method in a computer graphics display system for reducing the number of polygon intersection tests required to test a ray against a set of polygons, comprising:

identifying a multitude of polygons representing objects or parts of objects;

for each of the polygons, i) determining a polygon normal vector, and ii) determining and storing a compressed representation of the polygon vector;

grouping the polygons together into a plurality of groups on the basis of the compressed representations of the polygon vectors;

for each of said groups, determining a group unit normal vector from the compressed representations of the polygon vectors of the polygons in the group, and determining a directional classification code for the group;

identifying a ray representing a line of sight;

identifying a direction vector for the ray;

determining a directional classification code for the ray from the direction of the ray;

testing the directional classification code for the ray against the directional classification codes of the polygon groups;

on the basis of said testing, eliminating selected groups of the polygons from further consideration;

testing polygons in remaining groups to determine if the ray intersects the polygons; and rendering polygons of the non-eliminated groups that are intersected by the ray, thereby resulting in a more efficient computer graphics display system.

16. A method according to claim 15, further comprising:

providing a directional classification code of zero to represent rays or polygons for which directional classification does not apply or has not been applied; and using a directional classification test that always returns positive when testing any directional classification code against a directional classification code of zero.

17. A method according to claim 15, further comprising using a rendering preprocess of sorting the polygons in a directionally classified triangle list in order from most positive maximum group unit normal extent to most negative group unit normal extent.

18. A method according to claim 15, further comprising using a rendering preprocess of sorting the rays to be tested against a sorted directionally classified triangle list in order from most positive maximum group unit normal extent to most negative group unit normal extent.

19. A method according to claim 15, further comprising eliminating intersection tests by testing a group of rays with a common directional classification code against a group of polygons with a common directional classification code with a single directional classification test (instead of testing each ray individually against the group of polygons.

20. A method according to claim 15, further comprising using an early exit test of removing a ray from the list of rays to be tested against a sorted directionally classified triangle list when the maximum extent of the triangles being tested is greater than the minimum extent of the ray.

21. A method according to claim 20, further comprising replacing a ray which passes the early exit test with a ray whose maximum extent is less than the minimum extent of the polygon currently being processed.

22. A method according to claim 15, further comprising skipping over those polygons whose minimum extent is greater than the maximum extent of the first ray in a sorted list of rays.

23. The method according to claim 15, wherein
the eliminating step eliminates directionally classified polygon groups from further consideration, each of the groups comprising a plurality of polygons represented by a directional classification code, whose directional classification code when compared with the directional classification code of the ray's directional vector using pre-established criteria would result in a positive dot product; and
the testing step tests the polygons in each of the directionally classified polygon groups against the ray if the results of the comparison show that a negative dot product would result or that the result is not certain for all vectors of the polygons represented by the directional classification code of each of the groups.

24. Apparatus in a computer graphics display system for reducing the number of polygons intersection tests required to test a ray against a set of polygons, comprising:
means for identifying a multitude of polygons representing objects of parts of objects;
means for determining a polygon normal vector for each of the polygons;
means for determining and storing a compressed representation of each of the polygon vectors;
means for grouping the polygons together into a plurality of groups on the basis of the compressed representations of the polygon vectors;
means for determining, for each of said groups, (i) a group unit normal vector from the compressed representations of the polygon vectors of the polygons in the group, and (ii) a directional classification code for the group;
means for identifying a ray representing a line of sight;
means for identifying a direction vector for the ray;
means for determining a directional classification code from the direction vector of the ray;
means for testing the directional classification code for the ray code against the directional classification codes for the polygon groups;
means for eliminating selected groups of the polygons from further consideration on the basis of said testing;
means for testing polygons in remaining groups to determine if the ray intersects the polygons; and
means for rendering polygons of the non-eliminated groups that are intersected by the ray, thereby resulting in a more efficient computer graphics display system.

25. The apparatus according to claim 24, wherein
the means for eliminating further comprises eliminating directionally classified polygon groups from further consideration, each of the groups comprising a plurality of polygons represented by a directional classification code, whose directional classification code when compared with the directional classification code of the ray's directional vector using pre-established criteria would result in a positive dot product; and
the means for testing further comprising testing the polygons in each of the directionally classified polygon groups against the ray if the results of the comparison show that a negative dot product would result or that the result is not certain for all vectors of the polygons represented by the directional classification code of each of the groups.

26. An article of manufacture comprising:
a computer usable medium having computer readable program code embodied therein for reducing the number of polygon intersection tests required to test a ray against a set of polygons, the computer readable program code in said article of manufacture comprising:
computer readable program code for causing a computer to identify a multitude of polygons representing images of objects or parts of objects;
computer readable program code for causing a computer to group the polygons together into a plurality of groups on the basis of the general orientations of the polygons;
computer readable program code for causing a computer to determine a group orientation value representing the general orientations of the polygons in each group;
computer readable program code for causing a computer to identify a ray representing a line of sight;
computer readable program code for causing a computer to determine a ray direction value representing the general direction of the ray;
computer readable program code for causing a computer to compare the direction value of the ray with the group orientation values of ad groups of polygons;
computer readable program code for causing a computer to eliminate selected groups of polygons from further consideration on the basis of said comparison;
computer readable program code for causing a computer to test polygons in remaining groups to determine if the ray intersects the polygons; and
computer readable program code for causing a computer to render polygons of the non-eliminated groups that are intersected by the ray, thereby resulting in a more efficient article of manufacture.

27. An article of manufacture according to claim 26, wherein the computer readable program code for causing a computer to group the polygons together includes:
computer readable program code for causing a computer to determine, for each of the polygons, a polygon orientation value representing the general orientation of the polygon; and computer readable program code for causing a computer to group the polygons together into the plurality of groups on the basis of the determined polygon orientation values.

28. The article of manufacture according to claim 26, further comprising:

computer readable program code for causing a computer to compute a directional classification code of the ray, and eliminate directionally classified polygon groups from further consideration, each of the groups comprising a plurality of polygons represented by a directional classification code, whose directional classification code when compared with the directional classification code of the ray's directional vector using pre-established criteria would result in a positive dot product; and computer readable program code for causing a computer to test the polygons in each of the directionally classified polygon groups against the ray if the results of the comparison show that a negative dot product would result or that the result is not certain for all vectors of the polygons represented by the directional classification code of each of the groups.

* * * * *